US012484862B2

(12) United States Patent
Pierre et al.

(10) Patent No.: US 12,484,862 B2
(45) Date of Patent: Dec. 2, 2025

(54) METHOD AND SYSTEM FOR RECONSTRUCTING A 3D MEDICAL IMAGE

(71) Applicant: ECENTIAL ROBOTICS, Gieres (FR)

(72) Inventors: Arnaud Pierre, Gieres (FR); Karim Ferhat, Gieres (FR); Gautier Daune, Gieres (FR)

(73) Assignee: ECENTIAL ROBOTICS, Gieres (FR)

( * ) Notice: Subject to any disclaimer, the term of this patent is extended or adjusted under 35 U.S.C. 154(b) by 215 days.

(21) Appl. No.: 18/288,341

(22) PCT Filed: Jun. 28, 2022

(86) PCT No.: PCT/EP2022/067795
§ 371 (c)(1),
(2) Date: Oct. 25, 2023

(87) PCT Pub. No.: WO2023/275087
PCT Pub. Date: Jan. 5, 2023

(65) Prior Publication Data
US 2024/0215932 A1 Jul. 4, 2024

(30) Foreign Application Priority Data
Jun. 29, 2021 (EP) ..................................... 21305891

(51) Int. Cl.
*A61B 6/02* (2006.01)
*A61B 6/00* (2024.01)
(Continued)

(52) U.S. Cl.
CPC .............. *A61B 6/027* (2013.01); *A61B 6/102* (2013.01); *A61B 6/4441* (2013.01);
(Continued)

(58) Field of Classification Search
CPC . G06T 15/08; G06T 2200/04; G06T 2210/41; A61B 6/027; A61B 6/0407;
(Continued)

(56) References Cited

U.S. PATENT DOCUMENTS

2018/0160994 A1* 6/2018 Harrington .......... A61B 6/4417
2018/0368791 A1 12/2018 Thomas et al.
2020/0323498 A1 10/2020 Tong

OTHER PUBLICATIONS

Incetan Kagan et al: "RGB-D Camera-Based Clinical Workflow Optimization for Rotational Angiography", IEEE Sensors Journal, IEEE, USA, vol. 20, No. 15, Apr. 3, 2020 (Apr. 3, 2020), pp. 8867-8874, XP011797321, ISSN: 1530-437X, DOI: 10.1109/JSEN.2020.2985502 [retrieved on Jul. 2, 2020].
(Continued)

*Primary Examiner* — David J Makiya
*Assistant Examiner* — Miya Downing
(74) *Attorney, Agent, or Firm* — Thomas | Horstemeyer, LLP

(57) ABSTRACT

The invention relates to a method for reconstructing a 3D medical image of a region of interest of a patient's body (P) lying on an operating table (200) with an X-ray imaging system comprising a motorized C-arm (100) supporting an X-ray source (101), an X-ray image detector (102) and an anti-collision device (104), comprising: —implementing a first path of the motorized C-arm without acquiring any X-ray image, said first path comprising at least two different angular positions around a rotation axis of the C-arm; —at each angular position of the C-arm along said first path, detecting with the anti-collision device (104) an external surface (S) of the patient's body and recording volumetric data of a patient's body portion enclosing the region of interest; —computing a volumetric model of the patient's body portion based on said volumetric data and on an estimation of X-ray absorption of patient's body tissues (Continued)

surrounding the region of interest, said volumetric model comprising a first part including the region of interest and at least one second part distinct from the first part, the first and second parts presenting different levels of X-ray absorption; —implementing a second path of the motorized C-arm and acquiring a 2D X-ray image at each angular position of the C-arm along said second path; —reconstructing a 3D medical image from the acquired 2D X-ray images, wherein said reconstructing comprises estimating, for each X-ray passing through a voxel of the 3D medical image, a level of X-ray absorption by the patient's body based on the volumetric model of the patient's body portion and adjusting a contribution of said X-ray to each voxel of the 3D medical image based on said estimated level.

12 Claims, 3 Drawing Sheets

(51) Int. Cl.
*A61B 6/10* (2006.01)
*G06T 15/08* (2011.01)

(52) U.S. Cl.
CPC ............ *A61B 6/4476* (2013.01); *A61B 6/488* (2013.01); *A61B 6/547* (2013.01); *G06T 15/08* (2013.01); *G06T 2200/04* (2013.01); *G06T 2210/41* (2013.01)

(58) Field of Classification Search
CPC ..... A61B 6/102; A61B 6/4441; A61B 6/4476; A61B 6/488; A61B 6/547
See application file for complete search history.

(56) References Cited

OTHER PUBLICATIONS

European Search Report in related EP Application No. 21305891, mailed Nov. 27, 2021.
PCT Search Report in related PCT Application No. PCT/EP2022/067795, mailed Aug. 10, 2022.

\* cited by examiner

METHOD AND SYSTEM FOR RECONSTRUCTING A 3D MEDICAL IMAGE

CROSS REFERENCE TO RELATED APPLICATIONS

This application is the 35 U.S.C. § 371 national stage application of PCT Application No. PCT/EP2022/067795, filed Jun. 28, 2022, which application claims the benefit of European Application No. EP 21305891.0 filed Jun. 29, 2021, both of which are hereby incorporated by reference herein in their entireties.

TECHNICAL FIELD

The present disclosure relates to a method for reconstructing a 3D medical image and an X-ray imaging system configured for implementing said method.

TECHNICAL BACKGROUND

X-Ray imaging systems are frequently used during surgical procedures to provide physicians with image-based information about a patient's anatomical situation and/or the position and orientation of a surgical instrument with respect to the patient.

Such X-ray imaging systems generally provide two-dimensional (2D) projection images with different anatomical structures superimposed along the path of the X-rays.

A typical example of such a system for use in an intra-operative setting is the so-called C-arm which comprises a base frame on which a C-shaped arm is attached with several intermediate joints allowing moving the C-shaped arm in space along several degrees of freedom. One end of the C-shaped arm carries an X-ray source and the opposite end carries an image detector.

Due to the limited information provided by these 2D images, three-dimensional (3D) imaging techniques have become necessary over the past decades.

While computer tomography imaging systems is a well-established class of stationary X-ray imaging systems used for 3D reconstruction in a radiology department, these systems are in general not usable inside an operating room.

Recent years have seen an increasing interest in tomographic reconstruction techniques, also known as cone-beam reconstruction techniques (CBCT), using two-dimensional detectors.

Special efforts have been made to enable the aforementioned C-arms to provide three-dimensional information by automatically acquiring a set of 2D images and subsequently reconstructing a 3D image reconstruction based on said cone-beam reconstruction techniques.

An inherent problem with this imaging modality is the overall image quality, and more particularly the non-uniformity of the reconstructed 3D image.

In general, such reconstruction considers that the volume to be reconstructed is isolated in a non-absorbent world in terms of X-rays, whereas in reality, the volume is located at least partially within a patient lying on an operating table: the body of the patient absorbs some energy of the X-rays going through it, and so does the operating table.

So, each X-ray beam of each 2D X-ray image contributing to said volume, as it does not go through the same length of body mass as the others, is not absorbed the same way as the others: for example, X-ray beams when the C-arm is in a lateral configuration go through more body mass than X-rays when the C-arm is in a frontal configuration.

Therefore, a non-uniformity is introduced in the volume, which is detrimental to image quality.

However, it is often desirable, during minimally invasive surgery, to have a reconstructed 3D image as uniform as possible.

It is thus desirable to enhance the uniformity of the reconstructed 3D image.

SUMMARY OF THE DISCLOSURE

A goal of the invention is to improve the uniformity of a 3D medical image.

To that end, a first object is a method for reconstructing a 3D medical image of a region of interest of a patient's body lying on an operating table with an X-ray imaging system comprising a motorized C-arm supporting an X-ray source, an X-ray image detector and an anti-collision device adapted to detect an external surface of the patient's body, comprising:
  implementing a first path of the motorized C-arm without acquiring any X-ray image, said first path comprising at least two different angular positions around a rotation axis of the C-arm;
  at each angular position of the C-arm along said first path, detecting with the anti-collision device the external surface of the patient's body and recording volumetric data of a patient's body portion enclosing the region of interest;
  computing a volumetric model of the patient's body portion based on said volumetric data and on an estimation of X-ray absorption of patient's body tissues surrounding the region of interest, said volumetric model comprising a first part including the region of interest and at least one second part distinct from the first part, the first and second parts presenting different levels of X-ray absorption;
  implementing a second path of the motorized C-arm and acquiring a 2D X-ray image at each angular position of the C-arm along said second path;
  reconstructing a 3D medical image from the acquired 2D X-ray images, wherein said reconstructing comprises estimating, for each X-ray passing through a voxel of the 3D medical image, a level of X-ray absorption by the patient's body based on the volumetric model of the patient's body portion and adjusting a contribution of said X-ray to each voxel of the 3D medical image based on said estimated level.

Said method may be implemented by a control unit of the X-ray imaging systeM

Thanks to the volumetric model computed during the first path, it is possible to determine, for each X-ray passing through the patient's body, the level of absorption of the X-ray by tissues surrounding the region of interest, that are not included in the reconstructed 3D medical image, and to adjust the contribution of said X-ray in the 3D medical image. In the way, the reconstructed 3D medical image presents a greater uniformity.

In some embodiments, the second path is identical to the first path.

In other embodiments, the second path is different from the first path, the method comprising computing the second path by modifying the first path so as to reduce a distance between the X-ray image detector and the region of interest whilst avoiding collisions between the X-ray source and detector, the operating table and the patient's body.

In some embodiments, the second part of the volumetric model of the patient's body portion presents a uniform level of X-ray absorption.

Said uniform level of X-ray absorption may be substantially equal to the level of absorption of X-ray by water.

In some embodiments, the volumetric model of the patient's body portion surrounding the region of interest comprises at least two distinct second parts, each part presenting a different level of X-ray absorption.

The anti-collision device may comprise at least one of: a proximity sensor, a telemeter, a LIDAR and a tactile sensor.

The volumetric data may comprise a distance between the X-ray image detector and the patient's body portion for each angular position of the motorized C-arm along the first path.

The anti-collision device preferably has a fixed and known position relative to the X-ray detector.

Another object of the disclosure is a medical X-ray imaging system, comprising:
- a motorized C-arm supporting an X-ray source, an X-ray image detector and an anti-collision device, and
- a control unit coupled to the motorized C-arm, configured to implement the method described above.

The anti-collision device may advantageously comprise at least one of: a proximity sensor, a telemeter, a LIDAR and a tactile sensor.

Preferably, the anti-collision device has a fixed and known position relative to the X-ray detector.

BRIEF DESCRIPTION OF THE FIGURES

Further features and advantages will appear in the following description, based on appended drawings, in which.

For the sake of legibility, the figures have been drawn to scale. Reference signs identical from one figure to another one represent a same element, which may not be described in detail again.

DETAILED DESCRIPTION OF EMBODIMENTS

The invention may be implemented for acquiring 2D or 3D X-ray images in the context of a surgical intervention carried out onto a patient's bone, including but not limited to: implantation of orthopedic implants such as pedicular screws in the spine, implantation of various orthopedic implants in bones, reduction and fixation of fractures during traumatological procedures, positioning guides or canulae at a desired position with respect to a predefined target, or insertion of catheters or stents during cardio-vascular or urology procedures.

In this regard, the X-ray imaging system may be coupled to other surgical systems, such as a localization system and/or a surgical robotic system.

X-Ray Imaging System

Figure 1:
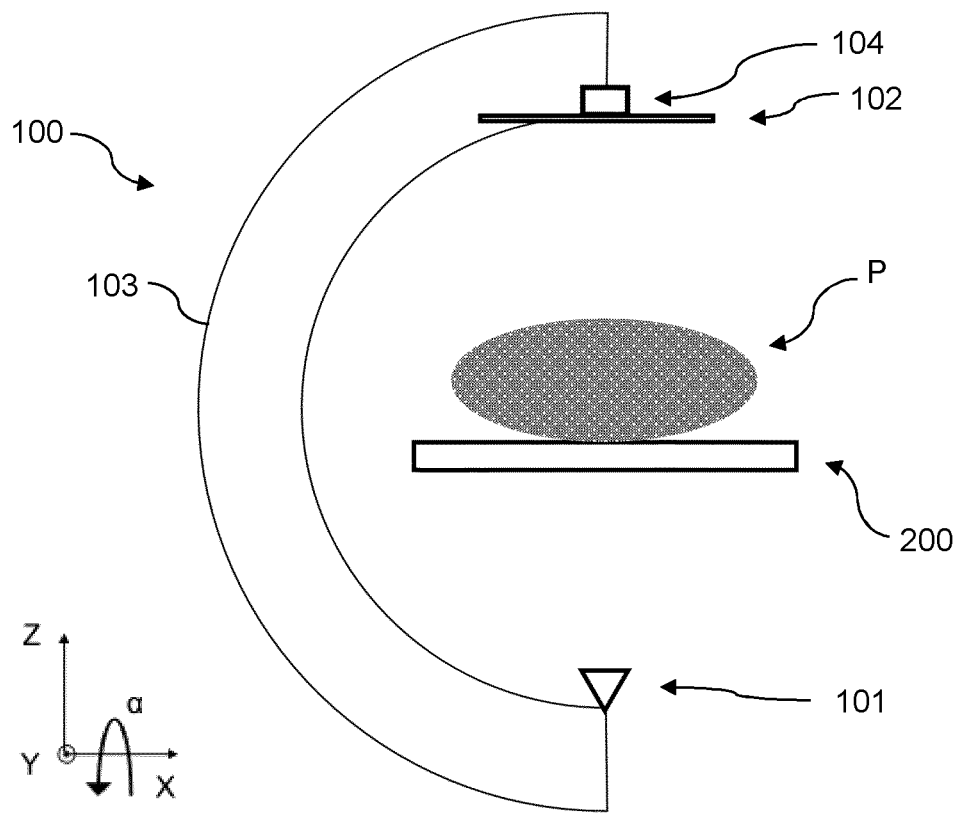
FIG. 1 schematically illustrates a motorized C-arm, an operating table and a patient's body.

As depicted in FIG. 1, the X-ray imaging system 100 comprises at least one X-ray source 101 and at least one X-ray image detector 102. The X-ray image detector may comprise a flat detector panel.

The X-ray source and X-ray image detector are carried by a C-shaped gantry 103, the X-ray source and X-ray image detector being arranged on opposite ends of the gantry. Due to the shape of the gantry, such an imaging system is usually called a C-arm. The center of the segment connecting the center of the X-ray source and the center of the detector is called the isocenter of the C-arm.

In a manner known per se, the X-ray imaging system is configured to produce at least one 2D X-ray image that is the result of a conical projection of a patient anatomy, wherein the tip of the cone is approximately the central point of the X-ray source and the basis of the cone is approximately the portion of the X-ray image detector that is reached by X-ray beams that have been collimated in a given shape and orientation. For example, the X-ray imaging system may be a conventional C-arm, or any Cone-Beam Computed Tomography (CBCT) imaging system such as the SURGIVISIO device (ECENTIAL ROBOTICS, Gieres, France), or VISION FD VARIO 3D (ZIEHM), CIOS SPIN MOBILE 3D (SIEMENS), AIRO (STRYKER), LOOP-X (BRAINLAB), O-ARM (MEDTRONIC).

A conventional C-arm is designed to allow the gantry to move relative to a base so as to move the X-ray source and detector about a patient while obtaining projection images of the patient placed between the X-ray source and the X-ray detector of the gantry.

In preferred embodiments, the X-ray imaging system may be motorized. In particular, the C-shaped gantry may comprise motors allowing movement horizontally (X and Y directions), vertically (Z direction) and around the X direction (defined by an angle α), so that 2D X-ray images of the patient may be produced from almost any angle. As shown on FIG. 1, the X axis is transversal to the operating table 200 on which the patient lies and the Y axis is parallel to the longitudinal axis of said operating table.

Each motor is associated to an encoder that provides at any time the relative position of the X-ray imaging system with respect to a reference position. When a 2D X-ray image is acquired, the corresponding position of the imaging system is recorded. Thus, each 2D image is recorded in the referential of the imaging system.

The trajectory of the motorized C-arm is determined by each 2D X-ray image position of acquisition of said C-arm while performing a 3D image acquisition.

In some embodiments, the C-arm may comprise a mobile base (not shown) allowing displacing the C-arm in the operating room. The C-shaped gantry may thus be slidably and/or pivotably mounted on said mobile base. The motors of the C-arm may be arranged in the mobile base and/or in the gantry.

Control Unit

The C-arm is controlled by a control unit which typically comprises a processor, a data storage device and a communication device.

The control unit may advantageously be embedded in the mobile base of the X-ray imaging system. Said base may also comprise switches, such as a power switch, an emergency button and the like.

Alternatively, said control unit may be embedded in a separate cart with at least one interface with the C-arm, or may be remote, for example in a separate control room of the hospital or in a data center.

In preferred embodiments, the control unit may be able to control other surgical systems in the operating room.

Anti-Collision Device

The X-ray imaging system further comprises an anti-collision device 104 fixed to a movable part of the C-arm. Said anti-collision device may be activated to detect obstacles in the vicinity of said movable part of the C-arm when it is moving. Such an anti-collision device may typically be used in a preliminary path of the C-arm, before launching acquisition of a set of 2D X-ray images, in order to make sure that said path does not involve any collision of the C-arm with the patient or any other object in the environment of the patient, such as the operating table. The anti-collision device may also be activated during acquisition of a set of 2D X-ray images, in order to prevent any collision of the C-arm with the patient or any other object in the environment of the patient, in particular if the environment has changed since the preliminary path.

The anti-collision device may rely on various sensor technologies to detect an obstacle in the vicinity of the C-arm. Said obstacle may be the patient's body or any object located in the vicinity of the patient. For example, but non-limitatively, the anti-collision device may comprise a proximity sensor (e.g. a capacitive sensor), a telemeter, a LIDAR (Laser Imaging, Detection And Ranging), a stereo camera and/or a tactile sensor.

The anti-collision device is coupled to the control unit, so as to send to the control unit data regarding potential obstacles, such as a distance between the anti-collision device and an object.

The control unit may be configured to stop the movement of the C-arm in case the anti-collision device has detected an object at a distance smaller than a predetermined distance from the moving part of the C-arm.

In the method according to the invention, the anti-collision device is used not only to detect obstacles and prevent a collision with such obstacles, as provided by the conventional use of such an anti-collision device, but also (or alternatively) to detect an outer surface of the patient's body and record the position of each detected point of this outer surface along the path of the C-arm. It is to be noted that this detection does not require changing the design of the anti-collision device, since the detection of an obstacle is based on measurement of a distance between the anti-collision device and the obstacle (the outer surface of the obstacle being detected by the sensor(s) of the anti-collision device). In particular, all anti-collision devices mentioned above allow detecting the outer surface of the patient's body. However, in conventional use of the anti-collision device, no recording is made of the distance between the anti-collision device and the obstacle along the path of the C-arm.

Figure 2:
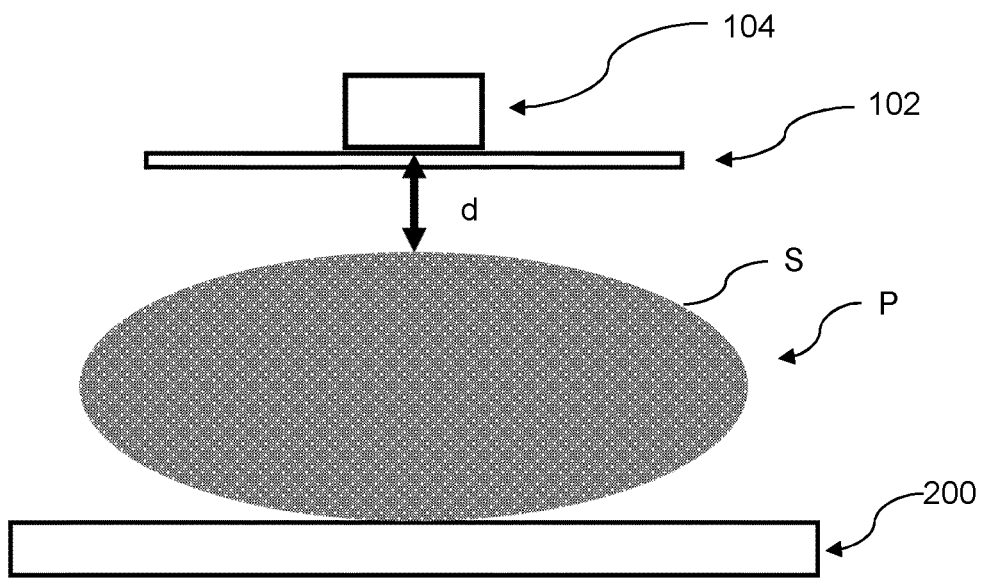
FIG. 2 is an enlarged view of the X-ray detector and the anti-collision system.

As shown in FIG. 2, which is an enlarged view of the C-arm of FIG. 1, the anti-collision device 104 is capable of measuring a distance d between the outer surface S of the patient's body and the sensor(s) of the anti-collision device at each position of the C-arm along its path.

In order to increase the accuracy of the determination of the distance between the outer surface of the patient's body and the anti-collision device, it may be advantageous to bring the anti-collision device as close as possible to the patient.

Since the X-ray detector has to be placed as close as possible to the patient to increase the size of the 3D reconstructed image, the anti-collision device 104 may, in preferred embodiments, be located on the X-ray detector 102, for example fixed to the side of the X-ray detector opposite to the detector panel, as shown in FIGS. 1 and 2. Alternatively, the anti-collision device may be attached to the gantry 103, preferably in the vicinity of the X-ray detector 102.

During a path of the C-arm, the anti-collision device may thus send volumetric data of the patient's body to the control unit. Said data may be raw sensor data, for example in the form of an electric signal, a video signal or any other type of signal depending on the anti-collision technology, issued by the anti-collision device. The control unit then treats the raw sensor data to compute volumetric data of the patient's body. Alternatively, the anti-collision device may itself send volumetric data to the control unit.

In practice, it is generally not necessary to obtain volumetric data of the whole patient's body, but only of a portion of the patient's body enclosing a region of interest which is to be imaged by the C-arm. For example, if the region of interest is a vertebra, the portion of the patient's body may be a portion of the patient's torso enclosing said vertebra and, if appropriate, adjacent vertebrae.

The volumetric data received or computed by the control unit may be typically a set of distances between the patient's body and the anti-collision device along the path of the motorized C-arm.

The path of the C-arm may be chosen to rotate around said portion of the patient's body in order to obtain a full set of volumetric data regarding the body portion. Alternatively, it may be possible to infer volumetric data from a partial set of data, regarding only a part of said body portion. For example, as the patient's body is considered to be symmetrical relative to the sagittal plane, it may be sufficient to obtain volumetric data for the body portion on one side of said sagittal plane. Besides, or alternatively, since the patient lies on the operating table, the surface of the body portion in contact with the operating table may be considered to coincide with the surface of the operating table—which may be detected by the anti-collision device—and it may thus be sufficient to obtain volumetric data for the body portion above the operating table.

Based on said volumetric data, the control unit is configured to compute a volumetric model of the patient's body portion.

Said volumetric model comprises at least two parts distinct from each other:
  a first part being the region of interest to be imaged, and
  at least one second part being a region of the patient's body surrounding the region of interest.

The location of the region of interest within the volumetric model may be assumed based on a priori knowledge of the patient's anatomy, for example general information on the size of the region of interest, the distance between the patient's skin and the region of interest, etc.

The at least one second part of the region of interest may thus be deduced by subtraction of the first part from the volumetric model.

Said at least one second part of the volumetric model presents a level of X-ray absorption which is different from the level of X-ray absorption of the first part.

The level of X-ray absorption of the second part can be determined from an estimation of X-ray absorption of patient's body tissues surrounding the region of interest.

A simple volumetric model may comprise a single second part extending around the region of interest, having a uniform level of X-ray absorption. For example, assuming that the tissues surrounding the region of interest comprise a large quantity of water, said level of X-ray absorption may be substantially equal to the level of absorption of X-ray by water. For information, the level of absorption of water may be estimated by its X-ray attenuation coefficient at a predetermined level of kV. At 100 kV, the attenuation coefficient of water is 0.167 cm-1.

A more complex volumetric model may comprise at least two second parts outside the region of interest, each part having a different level of X-ray absorption.

For example, a volumetric model may consist in a deformable X-ray absorption model of a human body, having a first second part corresponding to the skeleton of the human body and a second second part corresponding to the soft tissues of the human body (muscles, tendons, fatty tissue etc.). Said model may be deformable to be adjusted to the volumetric data acquired by the system.

Figure 3:
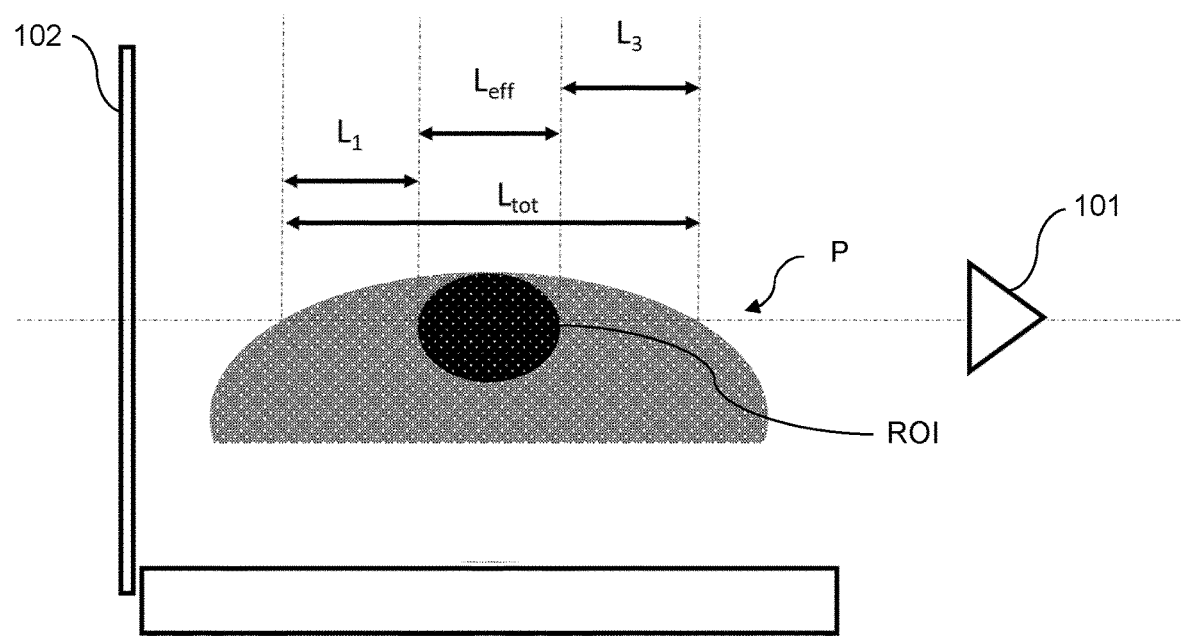
FIG. 3 schematically illustrates an X-ray passing through the patient's body and a decomposition of the various tissues traversed by said X-ray.

FIG. 3 schematically illustrates the principle of implementation of the volumetric model.

The dotted line represents the direction of an X-ray traversing the patient's body from the X-ray source 101 to the X-ray detector, in a given position of the X-ray source. The X-ray passes successively through a region of the patient's body outside the region of interest, through the region of interest and through another region of the patient's body outside the region of interest.

Since the location of the region of interest ROI relative to the volumetric model is known or assumed, it is possible to determine, for said X-ray, the length Leff of the region of interest ROI and the lengths L1 and L3 of the regions outside the region of interest, the length $L_{tot}$ of the trajectory of said X-ray through the patient's body being the addition of Leff, L1 and L3.

As a result, based on the volumetric model, it is possible to attribute to the X-ray different contributions to each voxel in the 3D medical image. More precisely, for the lengths L1 and L3 of the body outside the region of interest along the X-ray direction, it is considered that the X-ray is absorbed at a certain level.

A voxel in the 3D image results from the contributions of each X-ray passing through this voxel. Thus, based on the volumetric model, the control unit can adjust the contribution of each X-ray, by applying a different level of X-ray absorption to the part of the X-ray outside the region of interest.

As a result, the reconstructed 3D image presents a better uniformity.

This increased uniformity may in particular be advantageous in some specific types of surgery, for example surgical interventions on several bones (e.g. vertebrae), or for specific conditions of the patient, for example obese patients in which the bones are surrounded by a greater volume of tissues than in thin patients.

Method for Reconstructing the 3D Image

During a surgical intervention, a patient P lies on an operating table 200.

For example, in case of spine surgery, the patient may lie face down on the operating table, such that the region of interest, which may comprise one or several vertebrae, is accessible to the surgeon.

A path of the C-arm is computed so as to acquire a set of 2D X-ray images of the region of interest and reconstruct a 3D medical image based on said set of 2D X-ray images. The trajectory of the C-arm may involve at least one rotation, but it may also be more complex and combine at least one rotation and one translation, or several rotations. In some embodiments, the trajectory of the C-arm may be computed to increase the size of the reconstructed X-ray image or minimize patient's irradiation, which requires bringing the X-ray detector as close as possible to the patient, without colliding with the patient or any object in the vicinity of the patient, such as the operating table.

To that end, a first path of the C-arm is implemented around a portion of the patient's body including the region of interest, without acquiring any 2D X-ray image. The first path comprises a plurality of positions of the X-ray source and X-ray detector relative to the patient about at least one rotation axis, and, if appropriate about additional rotation or translation axes.

Along said first path, the anti-collision device is activated.

For each position of the C-arm along the first path, the anti-collision device detects not only the presence of objects in the environment of the C-arm, but also the external surface of the patient's body.

As a result, a set of volumetric data relating to the portion of the patient's body is recorded by the control unit. Said volumetric data may comprise a distance between the X-ray image detector and the patient's body portion for each angular position of the C-arm.

Figure 4A:
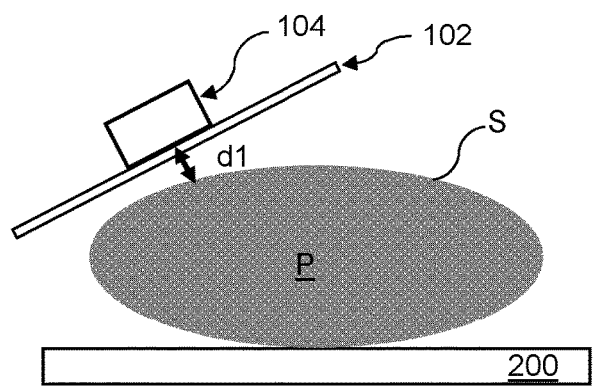
FIGS. 4A and 4B schematically illustrate two different positions of the X-ray detector relative to the patient's body along a path of the motorized C-arm.
Figure 4B:
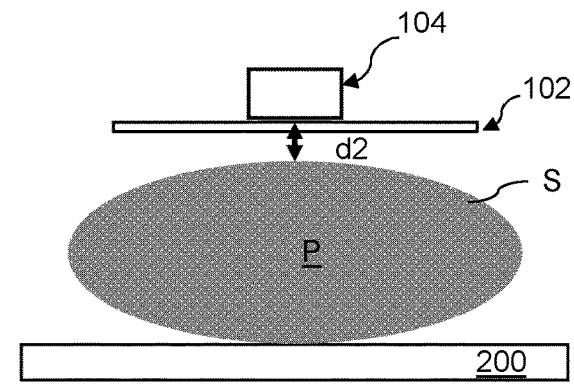

FIGS. 4A and 4B schematically illustrate two different positions of the X-ray detector relative to the patient's body along a path of the motorized C-arm, in which the X-ray detector 102 is at a distance d1, d2, respectively, from the patient's body, measured by the anti-collision device 104.

When the first path has been completed, the control unit computes a volumetric model of the portion of the patient's body based on the set of volumetric data.

As explained above, said volumetric model comprises at least two parts: a first part being the region of interest to be imaged, and at least one second part being a region of the patient's body surrounding the region of interest.

The control unit can determine the first part by one of the following methods. In some embodiments, information relating to the region of interest have been recorded in a memory of the control unit. Said information may include theoretical information based on knowledge of the anatomical structure of a patient; alternatively or in addition, said information may include data entered by a user before or during the surgical intervention, for example based on clinical examination or on X-ray image(s) of the patient.

Moreover, the dimensions of the region of interest may be known from the reconstruction parameters of the X-ray imaging system and the intrinsic parameters of the X-ray imaging system itself, in particular the size of the detector panel, the distance between the source and the detector panel notably.

The control unit can then determine the at least one second part by subtracting the first part from the volumetric model. In case it is desired to have at least two distinct second parts in the volumetric model, information relating to the definition of each second part may have been recorded in a memory of the control unit.

The definition of each second part may be related to the type of surgical procedure carried on by the physician, i.e. in which part of the human body the region of interest is situated. Said situation implies that the at least one second part is defined relative to the corresponding part of an absorption model of the human body. For example, in the case of pedicle screw placement on a set of vertebrae, the at least one second part may correspond to the part of the deformable absorption model of a human body corresponding to the outer regions of said set of vertebrae: lungs, rib cage, hip . . . .

The control unit also assigns a level of X-ray absorption to each second part. Said level of X-ray absorption may be recorded in a memory of the control unit.

The volumetric model is stored in a memory of the control unit.

In some embodiments, the first path may be optimized to have the X-ray detector as close as possible to the patient's body.

To that end, the first path may be computed by, for each angular position of the C-arm of said trajectory, computing a translation of the C-arm along a central axis extending between the X-ray source and a center of the X-ray image detector and passing by the center of the region of interest to reduce a distance between the X-ray image detector and the center of the region of interest whilst avoiding collisions between the X-ray source and detector and the operating table and/or the body.

Such a path, if implemented during 2D X-ray image acquisition, would allow maximizing the size of the 3D image and minimizing the X-ray dose received by the patient.

Indeed, each 2D image corresponds to a conical projection of the region of interest onto the the X-ray detector. The size of the reconstructed 3D volume is related to the size of the intersection of every cone of projection of a 3D acquisition. Thus, as the C-arm trajectory is such that each cone of projection meets the region of interest at its largest, i.e. if the detector is as close as possible of said region of interest, the result will be an optimal reconstructed volume in terms of size. In addition, since the region of interest is farther from the X-ray source, the X-ray dose received by the patient is reduced.

Figure 5:
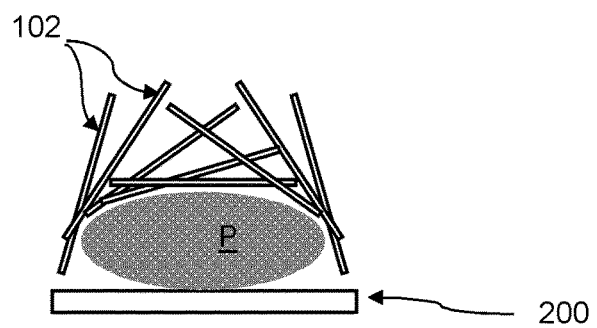
FIG. 5 illustrates a plurality of positions of the X-ray detector with respect to the patient's body along a path of the motorized C-arm (top) and a graph presenting the distance $d_n$ between the X-ray detector and the outside surface of the patient's body at each respective position n (bottom).
Figure 5:
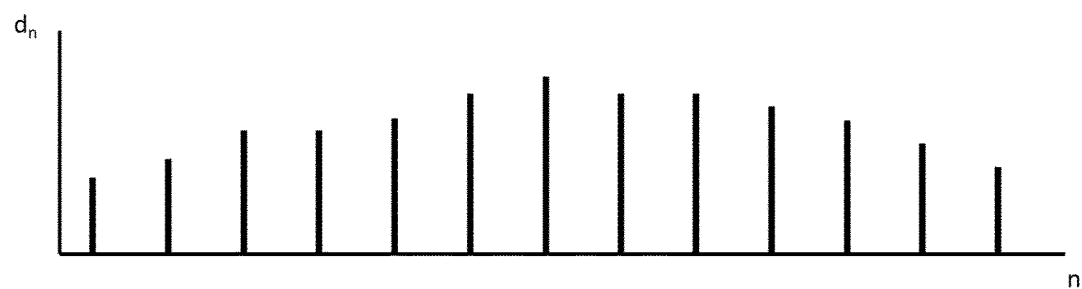

FIG. 5 (top) illustrates a plurality of positions of the X-ray detector 102 with respect to the patient's body along such an optimized first path. In each of said positions, the X-ray detector is as close as possible to the patient's body, while avoiding any collision between the C-arm and the operating table 200 or the patient's body.

FIG. 5 (bottom) illustrates a graph presenting the distance $d_n$ between the X-ray detector and the outside surface of the patient's body at each respective position n.

Said distances, associated with the respective angular position of the C-arm, form the set of volumetric data that is used by the control unit to compute the volumetric model.

After the first path has been completed, a second path of the C-arm is implemented around the same portion of the patient's body to acquire a set of 2D X-ray images at each angular position of the C-arm.

In some embodiments, the second path is identical to the first path.

In other embodiments, the second path may be different from the first path. For example, the anti-collision device may have detected an obstacle during the first path, and the second path has been adjusted to avoid said obstacle. In other situations, the first path may have been implemented without minimizing the distance between the X-ray detector and the patient's body, and the second path may be optimized to minimize said distance, as explained above.

The C-arm being motorized, each motor is associated to an encoder that provides at any time the relative position of the X-ray imaging system with respect to a reference position. As a result, even if the second path is different from the first path, the control unit is always able to establish a spatial relationship between a position of the C-arm during acquisition of a 2D X-ray image and the volumetric model.

The acquired set of 2D X-ray image is used by the control unit to reconstruct the 3D image. For said reconstruction, the control unit takes into account the volumetric model to estimate, for each X-ray passing through a voxel of the 3D image, a level of X-ray absorption by the patient's body and to adjust a contribution of said X-ray to each voxel of the 3D medical image based on the estimated level.

The invention claimed is:

1. A method for reconstructing a 3D medical image of a region of interest of a patient's body lying on an operating table with an X-ray imaging system comprising a motorized C-arm supporting an X-ray source, an X-ray image detector and an anti-collision device adapted to detect an external surface of the patient's body, the method comprising:
    implementing a first path of the motorized C-arm without acquiring any X-ray image, said first path comprising at least two different angular positions around a rotation axis of the C-arm;
    at each angular position of the C-arm along said first path, detecting with the anti-collision device an external surface of the patient's body and recording volumetric data of a patient's body portion enclosing the region of interest;
    computing a volumetric model of the patient's body portion based on said volumetric data and on an estimation of X-ray absorption of patient's body tissues surrounding the region of interest, said volumetric model comprising a first part including the region of interest and at least one second part distinct from the first part, the first and second parts presenting different levels of X-ray absorption;
    implementing a second path of the motorized C-arm and acquiring a 2D X-ray image at each angular position of the C-arm along said second path;
    reconstructing a 3D medical image from the acquired 2D X-ray images, wherein said reconstructing comprises estimating, for each X-ray passing through a voxel of the 3D medical image, a level of X-ray absorption by the patient's body based on the volumetric model of the patient's body portion and adjusting a contribution of said X-ray to each voxel of the 3D medical image based on said estimated level.

2. The method of claim 1, wherein the second path is identical to the first path.

3. The method of claim 1, wherein the second path is different from the first path, the method comprising computing the second path by modifying the first path so as to reduce a distance between the X-ray image detector and the region of interest whilst avoiding collisions between the X-ray source and detector, the operating table and the patient's body.

4. The method of claim 1, wherein the second part of the volumetric model of the patient's body portion presents a uniform level of X-ray absorption.

5. The method of claim 4, wherein said uniform level of X-ray absorption is substantially equal to a level of absorption of X-ray by water.

6. The method of claim 1, wherein the volumetric model of the patient's body portion surrounding the region of interest comprises at least two distinct second parts, each part presenting a different level of X-ray absorption.

7. The method of claim 1, wherein the anti-collision device comprises at least one of: a proximity sensor, a telemeter, a LIDAR and a tactile sensor.

8. The method of claim 1, wherein the volumetric data comprises a distance between the X-ray image detector and the patient's body portion for each angular position of the motorized C-arm along the first path.

9. The method of claim 1, wherein the anti-collision device has a fixed and known position relative to the X-ray detector.

10. A medical X-ray imaging system, comprising:
a motorized C-arm supporting an X-ray source, an X-ray image detector and an anti-collision device, and
a control unit coupled to the motorized C-arm, configured to implement the method of claim 1.

11. The medical X-ray imaging system of claim 10, wherein the anti-collision device comprises at least one of: a proximity sensor, a telemeter, a LIDAR and a tactile sensor.

12. The medical X-ray imaging system of claim 10, wherein the anti-collision device has a fixed and known position relative to the X-ray detector.

\* \* \* \* \*